Jan. 4, 1949.  K. R. RUNDE  2,458,304
SELF-TIGHTENING ROPE CLAMP
Filed Jan. 19, 1944
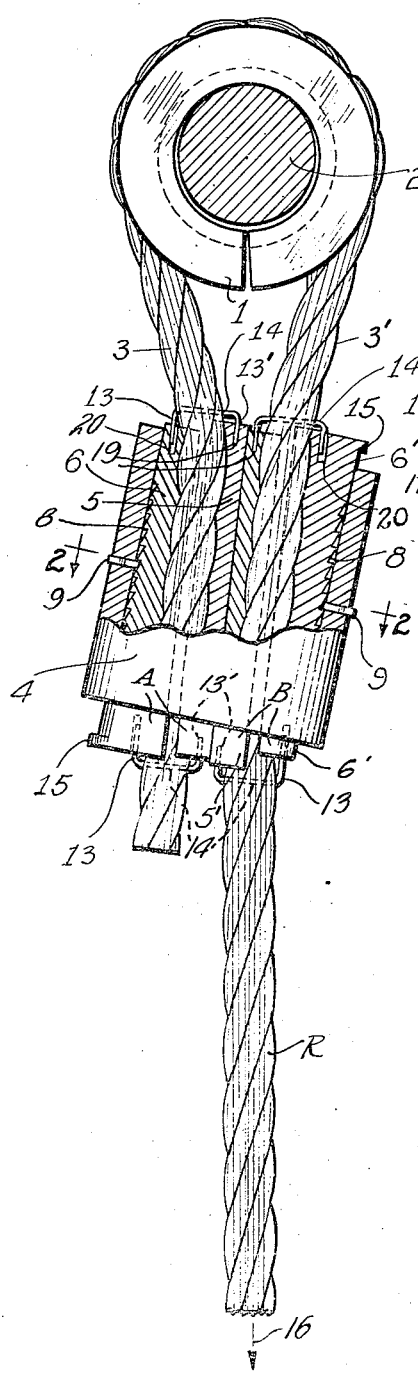
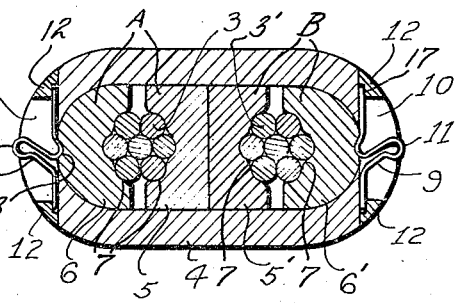
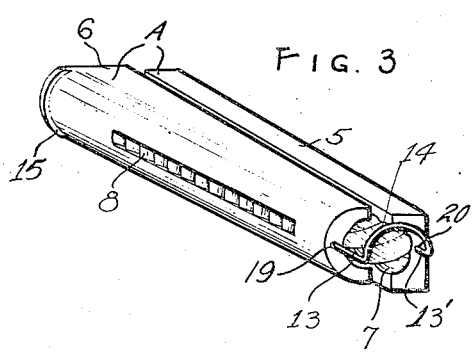
Inventor
KENNETH R. RUNDE
By: Ben V. Zillman
Attorney Patented Jan. 4, 1949

2,458,304

UNITED STATES PATENT OFFICE 2,458,304

SELF-TIGHTENING ROPE CLAMP

Kenneth R. Runde, Lemay, Mo.

Application January 19, 1944, Serial No. 518,787

3 Claims. (Cl. 24—136)

My invention relates to improvements in rope clips or clamps adaptable to any need wherein rope is used for hoisting, hauling, supporting heavy loads, etc., and the fields of such use covering that of land, air or sea machinery.

One of the principal objects of my invention is to so construct a clip or clamp of the kind described, that can be used in practically every place where clamps, clips, wedge sockets, speltered socket connections, and the like are now used, and which, although self-tightening, may be used over and over again without deforming or otherwise injuring the rope.

Another object of this invention is to so construct such a clamp that it will grip the rope on opposite sides of each portion of the latter that is to be clamped, and wherein the individual rope-gripping elements are longitudinally adjustable relative to each next adjacent gripping element, to thereby equalize the tension in all of the wires and strands being gripped, and thereby obtain the benefit of the maximum strength of the rope, without causing shearing or other deformation of the rope at said clamped portions.

A further object of my invention is to construct a clamp of the kind described, that it shall have but few parts and require a minimum amount of machining operations required thereon in the course of its manufacture.

An added object of this invention is to so construct a device of the kind described that it will have means to hold mating parts together as a unit, to thereby permit of easy and rapid handling of said parts at the time of clamping or releasing of the rope, and without disturbing the accessibility or operative relationship of the parts thus held together as a working unit.

A still further object of this invention is to so interconnect the clamp parts that although tightening is permitted when there is an increase in load acting on the rope, any slack in the loading will not cause the clamp parts to react to release the effectiveness of said clamping action.

Other objects of the instant invention are to so construct a rope clamp of the kind described, that the same may be assembled and dis-assembled without the use of special tools, said clamp being of such size that it uses a minimum of rope length and fits very closely adjacent the rope thimble or free end of the rope, requires but a single such clamp unit to hold a rope clamped, and which will be otherwise satisfactory and efficient for use wherever found applicable.

Many other objects and advantages of the construction herein shown and described and the uses mentioned, will be obvious to those skilled in the art to which this invention appertains, as will be apparent from the disclosures herein given.

To this end, my invention consists in the novel construction, arrangement and combination of parts herein shown and described, and the uses mentioned, as will be more clearly pointed out in the following specification.

In the drawings, wherein like reference characters indicate like or corresponding parts throughout the views, Figure 1 is a plan view, partly in section, of the clip in operative position;

Figure 2 is a cross-sectional view of the same, taken substantially along the line 2—2 of Fig. 1; and Figure 3 is a perspective detail, showing a pair of the rope-receiving shoes held together as an assembly unit.

Referring more particularly to the drawings, wherein I have illustrated a preferred embodiment of my invention, R represents a fragmentary portion of a length of rope, and is shown for illustrative purposes only.

It is often necessary to anchor or otherwise fasten wire rope at an end or at a point intermediate the ends, one such fastening arrangement being in the manner somewhat as shown in Fig. 1, wherein the length of rope is passed about a thimble I carried on a bar or cross member 2, and the two rope portions 3—3' being looped about said thimble, with the load acting on said rope in the direction indicated by the arrow 16 at the lower end of the longer of the pair of rope portions.

The clamp or clip used in the instant invention consists of an outer or enclosing shell, casing or tubular member 4, preferably of uniform or uninterrupted bore from end to end therethrough, and in order to achieve great strength with a minimum of material, and economically, may be of cold-drawn steel, shaped in cross-section as shown more clearly in Fig. 2.

A pair of shoes 5—6, of drop-forged, cast, or otherwise suitably formed material and elongated in a direction extending axially or longitudinally of the shell, comprises a handling unit *a* adapted to be slidably received as a unit within the shell, with the shoes of the pair engaging on opposite sides of and along the length of a wire rope portion 3. A second pair of shoes 5'—6', preferably of a size and shape corresponding to the pair 5—6 just described, form the handling unit B. The shoes may be provided with a concave channel at their opposed longitudinal faces to together form aligned jaws, each of said channels being grooved or ridged as indicated at 7 to conform generally to the exterior contour of the wire rope which they are intended to grip.

In the embodiment shown, the outermost shoe 6 or 6' of each said pair of shoes is longitudinally tapered in transverse cross-section from end to end to form a wedge, so that each pair of wedge shoes tend to expand or separate and are thereby self-tightening as they are adjusted lengthwise of one another or of the shell, in the manner of superimposed inclined planes, somewhat as shown and as will be more clearly hereinafter explained, and the shoe that is outermost or engages the shell is made convex in the embodiment shown, to conform to the shape of the inner surface of said shell.

With the pair of rope portions 3—3' arranged in the substantially parallel spaced-apart relation indicated, a pair of such wedge shoes is provided for each such rope portion within the shell, and the opposed faces of the inner ones of the pairs of shoes are slidable longitudinally along one another, so that each shoe is longitudinally adjustable relatively of each other shoe, and all of the shoes are longitudinally adjustably slidable relatively of the shell.

In order to prevent the releasing of the shoes from their clamping action on the rope in the shell, in the event of sudden slack in the rope, I have arranged a latch means, the same consisting in the present embodiment, of ratchet teeth 8 provided in one of the relatively longitudinally co-acting elements, as for example lengthwise of the outermost of the shoes 6—6' of the pairs, and co-acting with a preferably square cross-sectioned spring-metal resilient key or abutment 9 operatively held in place within a slot 10 completely through the wall of the shell, said key being provided with an inwardly extending portion 18 to engage within said teeth 8 and with projection or bight 11 that projects sufficiently outwardly from the shell to receive a nail or the like for releasing said key from locking position.

In normal operation, the keys are in the position shown in Figs. 1 and 2, and will ratchet over the teeth 8 as the outer shoes 6—6' move to wedge or compress the rope, but these keys will prevent longitudinal movement of said shoes 6—6' in the reverse direction. However, whenever it becomes necessary to remove said wedge shoes for any reason whatsoever, as in dis-assembly of the clip, a nail or other similar handy object may be forcibly inserted through the bight 11 of the keys, thereby actuating the central portion of the key outwardly and holding the latter away from its seating in the ratchet teeth and permitting movement of the shoes in both longitudinal directions. Both ends of each of said slots 10—10 may be closed by driving into each a filler or end closure 12 to seal the slot ends and being slightly undercut at 17, thereby providing seats for slidably receiving the ends of said keys.

Shoulders or flanges 15 may be provided on an end of each outer shoe 6—6', and both such shoes are preferably alike as shown, so that either one may be placed as a member of either pair.

In order to provide for ease in handling and speed in the operation of assembly and dis-assembly of the clip, without detracting from the full effectiveness and operability of the device, each pair of shoes forming the wedge may be interconnected as a unit, somewhat in the manner as shown in Figs. 1 and 3. To this end, I have provided a spring-metal interconnecting element having a pair of spaced-apart legs 13—13' extending in the same direction and with an intermediate portion 14 formed into an arc that is offset or to one side of the rope-receiving jaws or channels of the shoes and thus not interfere with the entry or passage or rope thereinto, the ends of the legs 13—13' being received in apertures provided at the ends of said shoes. The aperture 19 receiving one of the pair of legs of the interconnecting element is of a bore to make a snug but not tight fit with said leg, while the bore of the other aperture 20, in the companion shoe of each pair, is somewhat larger in diameter to give a lateral clearance as shown more clearly in Fig. 1, so that a small and limited amount of movement of each of the so interconnected shoes of each wedge pair is permitted laterally of one another while maintaining the pair in their desired unitary relationship. Such an interconnection still enables slight longitudinal movement of each shoe of a wedge pair relatively of the other whenever such relative longitudinal movement of the shoe occurs.

With a clip of the kind hereinbefore set forth, and assembled in the relationship indicated, an increase in the load that is acting on the rope, in the direction of the arrow 16 in Fig. 1, will actuate the wedge shoes to tighten, each shoe being free to adjust its position lengthwise independently of every other shoe, to thereby equalize the strain on the wires and strands and permit of full clamping without distortion or shearing of the rope.

Obviously, when the inner shoes of the adjoining pairs of wedge shoes are thus free to move longitudinally on one another, damage to the rope is effectively minimized, and thus, by making use of such a clip, the full strength of the rope may be obtained.

A short clamp or clip of the kind described, takes up a minimum of rope length and may be fitted up close to the thimble, and has other advantages that will readily suggest themselves to those skilled in the art to which this invention appertains.

What I claim as new and desire to secure by Letters Patent is:

1. A rope clamp comprising two pairs of rope-engaging shoes, and a shell of hollow flattened cylindrical form having a substantially uniform bore therethrough which receives for sliding movement therein said pairs of rope-engaging shoes, each pair of shoes comprising a wedge shaped outer shoe which slidingly engages the face of the bore of said shell, and an inner shoe of substantially uniform thickness in a longitudinal direction, said wedge shaped outer shoes of said pairs of shoes being tapered in opposite directions and said inner shoes of said pairs of shoes being in sliding contact with each other, the shoes of each pair of shoes receiving therebetween a portion of a rope and sliding movement of said pairs of shoes in opposite directions within said shell causing said rope portions to be gripped between the shoes of said pairs of shoes.

2. A rope clamp comprising two pairs of rope-engaging shoes, and a shell of hollow flattened cylindrical form having a substantially uniform bore therethrough which receives for sliding movement therein said pairs of rope-engaging shoes, each pair of shoes comprising a wedge shaped outer shoe which slidingly engages the face of the bore of said shell, and an inner shoe of substantially uniform thickness in a longitudinal direction, said wedge shaped outer shoes of said pairs of shoes being tapered in opposite directions and said inner shoes of said pairs of shoes being in sliding contact with each other, the shoes of each pair of shoes receiving therebetween a portion of a rope and sliding movement of said pairs of shoes in opposite directions within said shell causing said rope portions to be gripped between the shoes of said pairs of shoes, and means for connecting the shoes of each pair of shoes.

3. A rope clamp comprising two pairs of rope-engaging shoes and a shell of hollow flattened cylindrical form having a substantially uniform bore therethrough which receives for sliding movement therein said pairs of rope-engaging shoes, each pair of shoes comprising a wedge shaped outer shoe which slidingly engages the face of the bore of said shell, and an inner shoe of substantially uniform thickness in a longitudinal direction, said wedge shaped outer shoes of said pairs of shoes being tapered in opposite directions and said inner shoes of said pairs of shoes being in sliding contact with each other, the shoes of each pair of shoes receiving therebetween a portion of a rope and sliding movement of said pairs of shoes in opposite directions within said shell causing said rope portions to be gripped between the shoes of said pairs of shoes, and means comprising spring elements having arcuate portions for connecting the shoes of each pair of shoes.

KENNETH R. RUNDE.

REFERENCES CITED

The following references are of record in the file of this patent:

UNITED STATES PATENTS

| Number | Name | Date |
| --- | --- | --- |
| 433,669 | Austin | Aug. 5, 1890 |
| 1,269,507 | Proctor | June 11, 1918 |
| 1,496,803 | Amsler | June 10, 1924 |
| 1,624,399 | Ellis | Apr. 12, 1927 |
| 1,646,255 | Muehleman | Oct. 18, 1927 |
| 1,867,043 | Wirschitz | July 12, 1932 |
| 2,174,624 | Donald et al. | Oct. 3, 1939 |
| 2,193,269 | Cole | Mar. 12, 1940 |

FOREIGN PATENTS

| Number | Country | Date |
| --- | --- | --- |
| 13,230 | Great Britain | 1915 |
| 270,106 | Great Britain | May 5, 1927 |
| 475,664 | France | Mar. 15, 1915 |